United States Patent
Nefzger et al.

(10) Patent No.: US 10,982,039 B2
(45) Date of Patent: Apr. 20, 2021

(54) PUR/PIR RIGID FOAMS MADE OF POLYADDITION OLIGOESTERS

(71) Applicant: COVESTRO DEUTSCHLAND AG, Leverkusen (DE)

(72) Inventors: Hartmut Nefzger, Pulheim (DE); Torsten Hagen, Essen (DE); Klaus Lorenz, Dormagen (DE); Rene Abels, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 74 days.

(21) Appl. No.: 15/777,693

(22) PCT Filed: Nov. 23, 2016

(86) PCT No.: PCT/EP2016/078587
§ 371 (c)(1),
(2) Date: May 21, 2018

(87) PCT Pub. No.: WO2017/089417
PCT Pub. Date: Jun. 1, 2017

(65) Prior Publication Data
US 2018/0334530 A1    Nov. 22, 2018

(30) Foreign Application Priority Data
Nov. 26, 2015  (EP) .................................... 15196451

(51) Int. Cl.
| | | |
|---|---|---|
| C08G 18/42 | (2006.01) | |
| B32B 5/18 | (2006.01) | |
| C08J 9/00 | (2006.01) | |
| C08J 9/14 | (2006.01) | |
| C08G 18/76 | (2006.01) | |
| C08G 18/40 | (2006.01) | |
| C08G 18/48 | (2006.01) | |
| C08G 18/20 | (2006.01) | |
| B32B 21/08 | (2006.01) | |

(Continued)

(52) U.S. Cl.
CPC .......... *C08G 18/4261* (2013.01); *B32B 5/022* (2013.01); *B32B 5/18* (2013.01);
(Continued)

(58) Field of Classification Search
CPC ........... B32B 5/022; B32B 5/18; B32B 5/245; B32B 5/26; B32B 7/04; B32B 13/04; B32B 13/045; B32B 13/06; B32B 13/08; B32B 13/10; B32B 13/12; B32B 13/14; B32B 15/04; B32B 15/043; B32B 15/046; B32B 15/08; B32B 15/082; B32B 15/085; B32B 15/10; B32B 15/12; B32B 15/14; B32B 15/18; B32B 15/20; B32B 19/04; B32B 19/041; B32B 19/042; B32B 19/045; B32B 19/046; B32B 19/047; B32B 19/06; B32B 21/042; B32B 21/047; B32B 21/06; B32B 12/08; B32B 21/10; B32B 27/06; B32B 27/065; B32B 27/08; B32B 27/14; B32B 27/12; B32B 27/302; B32B 27/304; B32B 27/308; B32B 27/32; B32B 29/002; B32B 29/005; B32B 29/007; B32B 29/02;
(Continued)

(56) References Cited

U.S. PATENT DOCUMENTS

| | | | |
|---|---|---|---|
| 4,263,408 A | 4/1981 | Meyborg et al. | |
| 4,582,926 A | 4/1986 | Straehle et al. | |

(Continued)

FOREIGN PATENT DOCUMENTS

| | | |
|---|---|---|
| DE | 1247612 B | 8/1967 |
| DE | 1609668 A1 | 3/1972 |

(Continued)

OTHER PUBLICATIONS

W. Siefken in Justus Liebigs Annalen der Chemie, 562, pp. 75 to 136.

(Continued)

*Primary Examiner* — John M Cooney
(74) *Attorney, Agent, or Firm* — N. Denise Brown

(57) ABSTRACT

The invention relates to a method for producing PUR/PIR rigid foam materials, having the steps of reacting at least one polyester polyol (a), which can be obtained by reacting a. I.) at least one cyclic carboxylic acid anhydride; a.2.) at least one low-molecular dial with a molecular mass of 62 to 450 Da; and a.3.) at least one alkylene oxide; by esterifying the components a.I.) and a.2.) and subsequently oxalkylating the resulting carboxylic acid half-ester using component a.3.); wherein at least the oxalkylation is carried out using a.4.) at least one amine catalyst in which (the) nitrogen atom(s) is/are part of an aromatic ring system, with (b) at least one polyisocyanate-containing component, (c) at least one propellant, (d) at least one or more catalysts, (e) optionally at one flameproofing agent and/or other auxiliary agents, and (f) optionally at least one additional compound with at least two groups which are reactive towards isocyanates and which differ from polyester polyol (a). The invention also relates to a PUR/PIR rigid foam material which can be obtained using a method according to the invention, to a composite element comprising the PUR/PIR rigid foam material according to the invention, at least one cover layer selected from concrete, wood, press board, aluminum, copper, steel, stainless steel, paper, non-wovens, and plastic, and multilayer composites or a combination thereof. The invention also relates to the use of the PUR/PIR rigid foam materials according to the invention or the composite element according to the invention for heat damping.

16 Claims, No Drawings

(51) Int. Cl.
| | |
|---|---|
| B32B 5/24 | (2006.01) |
| B32B 7/04 | (2019.01) |
| B32B 27/12 | (2006.01) |
| B32B 19/04 | (2006.01) |
| B32B 21/06 | (2006.01) |
| B32B 5/26 | (2006.01) |
| B32B 15/10 | (2006.01) |
| B32B 29/00 | (2006.01) |
| B32B 13/14 | (2006.01) |
| B32B 15/12 | (2006.01) |
| B32B 13/08 | (2006.01) |
| B32B 27/08 | (2006.01) |
| B32B 5/02 | (2006.01) |
| B32B 15/18 | (2006.01) |
| B32B 27/32 | (2006.01) |
| B32B 13/04 | (2006.01) |
| B32B 15/04 | (2006.01) |
| B32B 27/10 | (2006.01) |
| B32B 13/12 | (2006.01) |
| B32B 27/30 | (2006.01) |
| B32B 13/06 | (2006.01) |
| B32B 13/10 | (2006.01) |
| B32B 15/14 | (2006.01) |
| B32B 15/08 | (2006.01) |
| B32B 21/04 | (2006.01) |
| B32B 27/06 | (2006.01) |
| B32B 15/085 | (2006.01) |
| B32B 19/06 | (2006.01) |
| B32B 21/10 | (2006.01) |
| B32B 15/20 | (2006.01) |
| B32B 15/082 | (2006.01) |
| B32B 29/02 | (2006.01) |
| C08G 18/18 | (2006.01) |

(52) U.S. Cl.
CPC ............... *B32B 5/245* (2013.01); *B32B 5/26* (2013.01); *B32B 7/04* (2013.01); *B32B 13/04* (2013.01); *B32B 13/045* (2013.01); *B32B 13/06* (2013.01); *B32B 13/08* (2013.01); *B32B 13/10* (2013.01); *B32B 13/12* (2013.01); *B32B 13/14* (2013.01); *B32B 15/04* (2013.01); *B32B 15/043* (2013.01); *B32B 15/046* (2013.01); *B32B 15/08* (2013.01); *B32B 15/082* (2013.01); *B32B 15/085* (2013.01); *B32B 15/10* (2013.01); *B32B 15/12* (2013.01); *B32B 15/14* (2013.01); *B32B 15/18* (2013.01); *B32B 15/20* (2013.01); *B32B 19/04* (2013.01); *B32B 19/041* (2013.01); *B32B 19/042* (2013.01); *B32B 19/045* (2013.01); *B32B 19/046* (2013.01); *B32B 19/047* (2013.01); *B32B 19/06* (2013.01); *B32B 21/042* (2013.01); *B32B 21/047* (2013.01); *B32B 21/06* (2013.01); *B32B 21/08* (2013.01); *B32B 21/10* (2013.01); *B32B 27/06* (2013.01); *B32B 27/065* (2013.01); *B32B 27/08* (2013.01); *B32B 27/10* (2013.01); *B32B 27/12* (2013.01); *B32B 27/302* (2013.01); *B32B 27/304* (2013.01); *B32B 27/308* (2013.01); *B32B 27/32* (2013.01); *B32B 29/002* (2013.01); *B32B 29/005* (2013.01); *B32B 29/007* (2013.01); *B32B 29/02* (2013.01); *C08G 18/1816* (2013.01); *C08G 18/2027* (2013.01); *C08G 18/4018* (2013.01); *C08G 18/4211* (2013.01); *C08G 18/4804* (2013.01); *C08G 18/7664* (2013.01); *C08G 18/7671* (2013.01); *C08J 9/0014* (2013.01); *C08J 9/0023* (2013.01); *C08J 9/0038* (2013.01); *C08J 9/0061* (2013.01); *C08J 9/141* (2013.01); *B32B 2250/40* (2013.01); *B32B 2255/00* (2013.01); *B32B 2255/02* (2013.01); *B32B 2255/06* (2013.01); *B32B 2255/08* (2013.01); *B32B 2255/10* (2013.01); *B32B 2255/12* (2013.01); *B32B 2266/0278* (2013.01); *B32B 2305/022* (2013.01); *B32B 2307/304* (2013.01); *B32B 2307/3065* (2013.01); *B32B 2307/50* (2013.01); *B32B 2307/546* (2013.01); *B32B 2307/72* (2013.01); *B32B 2307/734* (2013.01); *B32B 2419/04* (2013.01); *B32B 2419/06* (2013.01); *B32B 2439/00* (2013.01); *B32B 2509/10* (2013.01); *B32B 2605/00* (2013.01); *C08G 2110/0025* (2021.01); *C08J 2203/14* (2013.01); *C08J 2205/10* (2013.01); *C08J 2375/04* (2013.01); *C08J 2375/06* (2013.01); *C08J 2483/12* (2013.01)

(58) Field of Classification Search
CPC ............ B32B 2250/40; B32B 2255/00; B32B 2255/02; B32B 2255/06; B32B 2255/08; B32B 2255/10; B32B 2255/12; B32B 2266/0278; B32B 2305/022; B32B 2307/304; B32B 2307/3065; B32B 2307/50; B32B 2307/546; B32B 2307/72; B32B 2307/734; B32B 2419/04; B32B 2419/06; B32B 2439/00; B32B 2509/10; B32B 2605/00; C08G 18/1816; C08G 18/2027; C08G 18/4018; C08G 18/4211; C08G 18/4261; C08G 18/4804; C08G 18/7664; C08G 18/7671; C08G 2101/0025; C08J 9/0014; C08J 9/0023; C08J 9/0038; C08J 9/0061; C08J 9/141; C08J 2203/14; C08J 2205/10; C08J 2375/04; C08J 2375/06; C08J 2483/12

See application file for complete search history.

(56) References Cited

U.S. PATENT DOCUMENTS

| | | | |
|---|---|---|---|
| 4,757,097 A | 7/1988 | Dietrich et al. | |
| 6,710,096 B2 | 3/2004 | Neff et al. | |
| 2010/0261804 A1* | 10/2010 | Yamanaka | C08G 18/4018 521/137 |
| 2013/0035457 A1 | 2/2013 | Shutov et al. | |
| 2013/0035467 A1 | 2/2013 | Shutov et al. | |
| 2014/0370267 A1* | 12/2014 | Roers | C08G 18/4018 428/319.1 |

FOREIGN PATENT DOCUMENTS

| | | |
|---|---|---|
| EP | 2617748 A1 | 7/2013 |
| WO | 2012110585 A1 | 8/2012 |
| WO | WO-2013113741 A1 * | 8/2013 |

OTHER PUBLICATIONS

Polyurethane handbook (2nd ed.). Edited by G. Oertel, Hanser Publishers, Munich 1993, pp. 98-120. (Believed to correspond to "Kunststoffhandbuch [Plastics handbook] vol. VII, Polyurethane [Polyurethanes], Carl Hanser Verlag Munich, Vienna, 1st, 2nd and 3rd edn., 1966, 1983 and 1993.").

* cited by examiner

PUR/PIR RIGID FOAMS MADE OF POLYADDITION OLIGOESTERS

CROSS-REFERENCE TO RELATED APPLICATIONS

This application is a national stage application under 35 U.S.C. § 371 of PCT/EP2016/078587, filed Nov. 23, 2016, which claims the benefit of European Application No. 15196451.7, filed Nov. 26, 2015, both of which are being incorporated by reference herein.

FIELD

Rigid polyurethane-polyisocyanurate (PUR/PIR) foams are typically produced via a reaction of a polyol component with an isocyanate component in the presence of a blowing agent. Additives can moreover also be added, examples being foam stabilizers and flame retardants. Rigid PUR/PIR foams are distinguished from other rigid foams, for example rigid PUR foams, by having excellent thermal stability and improved fire properties. These improved properties are attributed to isocyanurate structural elements.

BACKGROUND

Short-chain polyester polyols are widely used in the prior art as polyol components of these rigid PUR/PIR foams. There are in principle two possibilities available for synthesis of these short-chain polyester polyols: Firstly, they can be produced by a polycondensation reaction from low-molecular-weight polyols, mostly diols, with low-molecular-weight polycarboxylic acids, mostly dicarboxylic acids, and/or with polycarboxylic acid equivalents such as anhydrides or esters with monohydric alcohols. Secondly, however, there is also the possibility of producing short-chain polyester polyols by a polyaddition reaction of alkylene oxides with hemiesters of the type that can by way of example be obtained by an additional reaction between diols and polycarboxylic anhydrides.

The variant involving the polyaddition reactions has many inherent advantages. Mention many be made by way of example of a greatly reduced reaction time in comparison with the polycondensation reaction, significantly less introduction of energy, because the reaction actually proceeds exothermically, and, not least, a practically quantitative reaction yield, for example because no yield-reducing water of reaction is eliminated.

There has therefore hitherto been no lack of attempts to utilize these polyaddition reactions for the production of short-chain polyester polyols.

DE 36 21 039 A1 describes this procedure and states in relation thereto that oligoesters which have hydroxy groups and have OH numbers of from 200 to 600 mg KOH/g by a reaction of cyclic dicarboxylic anhydrides with polyhydric alcohols and/or dialkanolamines in a molar ratio of 1:from 0.5 to 1.5, preferably 1:from 0.7 to 1.2, to give the corresponding dicarboxylic hemiesters and/or dicarboxylic hemiamides at temperatures of from 50 to 150° C., preferably from 90 to 130° C., followed by alkoxylation of the carboxy groups with ethylene oxide and/or propylene oxide, using an equivalents ratio of acid groups to alkylene oxides of 1:from 0.8 to 1.7, preferably 1:from 1.0 to 1.6, at temperatures of from 80 to 150° C., preferably from 90 to 130° C., characterized in that the alkoxylation reaction is carried out with use of propoxylation products of ammonia, of lower C2-C6-aliphatic diamines and of piperazine, where all of the NH functions in these have been propoxylated, as catalysts.

In relation to the catalysts to be used, DE 36 21 039 further states (page 3, line 56) that N-methylimidazole, which is an excellent transesterification catalyst, gives products with (undesirably) broad molar mass distribution, this being an outcome that should be avoided.

Although, therefore, the production of this type of N-methyimidazole-catalyzed polyol is described in a non-inventive comparative example (comparative example 2b, page 7, line 10), it is not reacted to give rigid PUR/PIR foam because according to the teaching of DE 36 21 039 the product has a broadened molar mass distribution and correspondingly increased viscosity, i.e. has to be regarded as clearly unsuitable for this purpose. However, during the research work underlying this patent application it has been found that when the catalysts favored in DE 36 21 039 are used, the preferred oligoester-OH-number range of from 100 to 280 mg KOH/g, corresponding to equivalent molar masses of from 200 to 560 g/mol, is obtainable only with very great difficulty, because the propoxylation products of ammonia, of lower C2-C6 aliphatic diamines and of piperazine rapidly lose their catalytic activity as OH number decreases.

DE 33 15 381 likewise describes a process for the production of polyester polyols or of polyether-polyester polyols, characterized in that polyols, preferably poly ether polyols with hydroxy numbers of from 15 to 250 mg KOH/g, are esterified with at least one carboxylic anhydride, preferably phthalic anhydride, in the presence of N-methylimidazole, triethylenediamine, triphenylphosphine or mixtures of at least two of these compounds, to give a carboxylic hemiester, and this is then alkoxylated with at least one alkylene oxide, preferably ethylene oxide, in the presence of N-methylimidazole as catalyst.

It should be noted, however, that the process disclosed in DE 33 15 381 is suitable (page 8, lines 27 and 28) for molar ratios of alkylene oxide/carboxy group of at most 1.5:1, preferably 1:1. However, it was an object of the present invention to broaden the prior art by providing, as oligoester components for rigid PUR/PIR foams, components whose dicarboxylic acid units have been esterified mainly with dialkylene glycol structural units, thus requiring more than 1.5 mol of alkylene oxide in the addition reaction with the intermediate hemiester structures. DE 33 15 381 did not acknowledge the possibility that simple imidazole catalysis or catalysis with imidazole derivatives could also be used to link genuine dialkyleneglycol structural units to hemiester structures. Nor, moreover, are there any indications that polyester polyols or polyether-polyester polyols of this type could be useful as polyol component in rigid PUR/PIR foams. DE 33 15 381 merely makes very general mention of the production of polyurethanes (page 3, line 4) from products of this type, but provides no relevant inventive examples, and does not claim the production of polyurethanes in general terms or specifically of rigid PUR-PIR foams.

The person skilled in the art could not therefore conclude from DE 33 15 381 and/or DE 36 21 039 that it is possible to use aminic catalysts in which the nitrogen atom(s) is/are part of an aromatic ring system, as is the case by way of example in imidazole or imidazole derivatives, as catalyst in the production of the ester structures desired in the present invention having oligoether units, and in particular to use these subsequently as polyol component in rigid PUR/PIR foams.

SUMMARY

It was therefore an object to provide rigid PUR/PIR foams whose polyol components are obtainable from cyclic carboxylic anhydrides, low-molecular-weight diols, and alkylene oxides with use of aminic catalysts in which the nitrogen atom(s) is/are part of an aromatic ring system, as is the case by way of example in imidazole or imidazole derivatives, where the quantity of alkylene oxide used per mole of carboxylic anhydride is preferably more than 1.5 mol and the OH numbers of the oligoesters thus obtainable are in the range from 100 to 280 mg KOH g.

Another object was to incorporate the abovementioned polyester components in rigid PUR/PIR foams and thus obtain rigid PUR-PIR foams with attractive properties, the properties of which reach at least the level of analogous rigid PUR/PIR foams based on conventional polycondensation polyols.

For the purposes of the present invention, rigid PUR/PIR foams are in particular those PUR/PIR foams whose envelope density in accordance with DIN EN ISO 845:2009-10 is in the range from 15 kg/m$^3$ to 300 kg/m$^3$, and whose compressive strength in accordance with DIN EN 826:2013 is in the range from 0.1 MPa to 5 MPa.

The present invention therefore provides a process for the production of rigid PUR/PIR foams, comprising the reaction of at least one polyester polyol (a) obtainable via reaction of a.1.) at least one cyclic carboxylic anhydride;

a.2.) at least one low-molecular weight diol with molecular weight from 62 to 450 daltons; and a.3.) at least one alkylene oxide; via esterification of components a.1.) and a.2.) followed by alkoxylation of the resultant carboxylic hemiester by means of component a.3.);

where at least the alkoxylation reaction uses a.4.) at least one aminic catalyst in which the nitrogen atom(s) is (are) part of an aromatic ring system, with (b) at least one polyisocyanate-containing component, (c) at least one blowing agent, (d) at least one catalyst, (e) optionally at least one flame retardant and/or other auxiliaries- and additional substances, (f) optionally at least one further compound having at least two groups which are reactive toward isocyanates and differ from the polyester polyol (a).

The invention further provides a rigid PUR/PIR foam obtainable by a process of the present invention.

The invention further provides a composite element comprising the rigid PUR/PIR foam of the present invention and at least one outer layer selected from concrete, wood, pressboard, aluminum, copper, stainless steel, other types of steel, paper, nonwoven fabric and plastic, and also multilayer composites, or from a combination thereof.

The present invention also provides the use of the rigid PUR/PIR foams of the present invention or of the composite element of the present invention for thermal insulation.

DETAILED DESCRIPTION

The parameters described hereinafter can preferably be determined by the test methods listed under the heading "Examples". The term "polyols" is also used for the polyester polyols (a) in the present invention.

Carboxylic anhydrides a.1.) that can be used are in principle cyclic aliphatic and aromatic dicarboxylic anhydrides such as maleic anhydride, itaconic anhydride, citraconic anhydride, succinic anhydride, glutaric anhydride, phthalic anhydride and tetrahydrophthalic anhydride. It is preferable to use maleic anhydride and/or phthalic anhydride and/or glutaric anhydride, and it is very particularly preferable to use phthalic anhydride or mixtures of carboxylic anhydrides consisting of at least 85% by weight of phthalic anhydride. It is moreover possible to use mixtures which consist of at least 85% by weight of cyclic carboxylic anhydride and of at most 15% by weight of one or more dicarboxylic acids, for example succinic acid, glutaric acid, adipic acid, sebacic acid, phthalic acid, terephthalic acid and isophthalic acid, where these can also optionally be obtained by fermentative routes.

It is moreover possible to use mixtures consisting of at least 85% of cyclic carboxylic anhydride and of at most 15% by weight of one or more anhydrides of monocarboxylic acids, for example acetic anhydride or benzoic anhydride.

Low-molecular-weight diols a.2.) which can be used, these being used for the purpose of ring-opening and the cyclic anhydrides, are in principle any of the diols with molecular weights in the range from 62 to 450 daltons, for example ethylene glycol, 1,3-propanediol, 1,2-propanediol, diethylene glycol, triethylene glycol, tetraethylene glycol, dipropylene glycol, tripropylene glycol, 1,4-butanediol, 2-methyl-1,3-propanediol, 1,5-pentanediol, neopentyl glycol, 1,6-hexanediol and 3-methyl-1,5-pentanediol, where these can be used individually or as mixture.

For the purposes of the present application, low-molecular-weight diols also comprise mixtures with higher-functionality alcohols and/or with monools selected from the group consisting of glycerol, 1,1,1-trimethylolpropane, pentaerythritol and monools, such as 2-ethyl-1-hexanol, butyl diglycol, methanol, ethanol, 1-propanol, 2-propanol, n-butanol, 2-butanol, 2-methyl-1-propanol, dodecanol, or of phenol derivatives, in so far as the proportion of these does not exceed 20% by weight, based on the entirety of the diols, higher-functionality alcohols or monools used.

However, it is preferable to use ethylene glycol, diethylene glycol, triethylene glycol and tetraethylene glycol, very particularly preferably diethylene glycol.

Carboxylic anhydride a.1.) and low-molecular-weight diol a.2.) are reacted in a molar ratio of 1:from 0.3 to 1.5, preferably 1:from 0.4 to 1.2, particularly preferably 1:from 0.5 to 0.8 to give the corresponding dicarboxylic hemiesters, a temperature range that has proven suitable here being from 50 to 150° C., preferably from 90 to 130° C.

Production of the dicarboxylic hemiesters from carboxylic anhydride a.1.) and low-molecular-weight diol a.2.) can take place with or without catalyst; it is preferable not to use catalyst.

Alkylene oxides a.3.) used for the alkoxylation of the intermediate products which comprise mainly hemiester structures and result from the ring-opening of the cyclic anhydrides by means of the low-molecular-weight diols are preferably butylene 1,2- or 2,3-oxide, ethylene oxide and propylene oxide, more preferably ethylene oxide or propylene oxide or mixtures of the two epoxides.

They can be added continuously to the reaction mixture. Blockwise addition of the epoxides or epoxide mixtures is likewise possible, for example in that propylene oxide alone or a mixture of propylene oxide and ethylene oxide that is rich in propylene oxide is first added, followed by addition of ethylene oxide alone or of a mixture of propylene oxide and ethylene oxide that is rich in ethylene oxide.

Preference is given to a proportion of ethylene oxide, based on the composition of the epoxides added, of from 90 to 100% by weight, based on the total weight of the alkylene oxide a.3.), and very particular preference is given to a proportion of from 95 to 100% by weight.

The alkoxylation reaction uses an equivalents ratio of acid groups to alkylene oxides of by way of example from 1:1.6 to 1:3.0, preferably from 1:1.7 to 1:2.5, at temperatures of from 80 to 150° C., preferably from 90 to 140° C.

The process of the invention preferably uses ≥1.5 mol of a.3.) per mole of a.1.). The OH number of (a) is preferably from 100 to 280 mg KOH/g.

Amines that can be used for the catalysis of the alkoxylation reaction a.4.) are aminic catalysts in which the nitrogen atom(s) is/are part of an aromatic ring system.

However, particular preference is given to aromatic amines selected from the group of imidazole and its derivatives, in particular N-methylimidazole.

The aminic catalyst can be added to the reaction mixture before the ring-opening of the cyclic carboxylic anhydride by means of the low-molecular-weight diols. However, it can also be added only after ring-opening has taken place, but before the alkylene oxide(s) is/are added.

Suitable catalyst concentrations are preferably in the range from 300 to 7000 ppm, more preferably from 500 to 5000 ppm, particularly preferably from 800 to 3000 ppm, based in each case on the total weight of (a) to (f).

Suitable polyesters (a) preferably have hydroxy numbers in the range from 200 to 600 mg KOH/g, and also functionalities of from 1.3 to 3.5, more preferably from 1.6 to 2.2, very particularly preferably from 1.8 to 2.1.

Polyisocyanate-containing components (b) used can in principle be aliphatic, cycloaliphatic, araliphatic, heterocyclic and particularly aromatic di- and/or polyisocyanates of the types described by W. Siefken in Justus Liebigs Annalen der Chemie, 562, pp. 75 to 136, for example those of the formula Q(NCO)n, in which n=from 2 to 4, where n is a number-average value, and Q is an aliphatic hydrocarbon moiety having from 2 to 18 carbon atoms, preferably from 6 to 12 carbon atoms, a cycloaliphatic hydrocarbon moiety having from 4 to 20 carbon atoms, preferably from 5 to 11 carbon atoms, an aromatic hydrocarbon moiety having on average from 6 to 27 carbon atoms, preferably from 6 to 23 carbon atoms, or an araliphatic hydrocarbon moiety having from 8 to 15 carbon atoms, preferably from 8 to 13 carbon atoms, examples being polyisocyanates of the type described on pp. 10 to 11 of DE-A 28 32 253. Particular preference is given to the polyisocyanates that are easily obtainable industrially, for example tolylene 2,4- and/or 2,6-diisocyanate, and also any desired mixtures of these isomers ("TDI"), diphenylmethane diisocyanates ("MDI"; 4,4'- and/or 2,4'- and/or 2,2'-isomers), polyphenyl polymethylene polyisocyanates of the type produced by aniline-formaldehyde condensation followed by phosgenation and optionally distillative concentration of the components having relatively large numbers of rings, and "modified polyisocyanates", which by way of example have carbodiimide groups, urethane groups, allophanate groups, isocyanurate groups, urea groups and/or biuret groups, in particular modified polyisocyanates, that derive from tolylene 2,4- and/or 2,6-diisocyanate and preferably from diphenylmethane 4,4'- and/or 2,4'-diisocyanate. Very particular preference is given to polyphenylene polymethylene polyisocyanates ("polymer MDI").

Blowing agents (c) that can be used for the purposes of the present invention are both physical and chemical blowing agents. Chemical blowing agents here are compounds which form gaseous compounds through reaction with isocyanates. In contrast, physical blowing agents used are compounds which are in liquid or gaseous form at 25° C. and do not enter into any chemical reaction with the isocyanate.

Physical blowing agents are compounds which have been dissolved or emulsified in the starting materials for polyurethane production, and vaporize under the usual reaction conditions, preferably at above 25° C. The temperature of a polyurethane foam of the invention typically increases during the course of production, starting from room temperature, to as far as about 180° C. Examples of physical blowing agents are hydrocarbons such as cyclopentane, isopentane and n-pentane, butane and propane, halogenated hydrocarbons, and other compounds, for example perfluorinated alkanes such as perfluorohexane, perfluorinated alkenes such as 1,1,1,2,3,4,5,5,5-nonafluoro-4-(trifluoromethyl)pent-2-ene, 1,1,1,3,4,4,5,5,5-nonafluoro-2-(trifluoromethyl)pent-2-ene or cis-1,1,1,4,4,4-hexafluoro-2-butene, fluorochloroalkenes such as trans-1-chloro-3,3,3-trifluoropropene, and also ethers, esters, ketones and/or acetals.

Examples of chemical blowing agents are water and carboxylic acids, which liberate carbon dioxide via reaction with isocyanates, with formation of urea and, respectively, amide.

It is preferable to use, as blowing agent component (c), hydrocarbons and/or water and/or at least one carboxylic acid. Hydrocarbons to which greater preference is given are hydrocarbons that are gaseous at 25° C., and greatest preference is given to n-pentane, cyclopentane, isopentane and/or mixtures of the isomers. These can be used in combination with water and/or carboxylic acids. In alternative embodiments, (c) is water and/or at least one carboxylic acid.

Quantities preferably used of blowing agent component (c) are from 0.1 to 30% by weight, preferably from 0.5 to 20% by weight, particularly preferably from 0.7 to 10% by weight, based on the total weight of components (a) to (f). Catalysts (d) that can be used for the production of the rigid PUR/PIR foams of the invention are by way of example the known catalysts for formation of polyurethane or of polyisocyanurate, for example organotin compounds such as tin diacetate, tin dioctanoate, dibutyltin dilaurate and/or strongly basic amines such as 2,2,2-diazabicyclooctane, triethylamine, triethylenediamine, pentamethyldiethylenetriamine, N,N-dimethylcyclohexylamine or bis(N,N-dimethylaminoethyl) ether, N,N-dimethylbenzylamine and N-methylimidazole, and also by way of example in order to catalyze the PIR reaction potassium acetate, sodium acetate, sodium N-[(2-hydroxy-5-nonylphenyl)methyl]-N-methylaminoacetate, 2,4,6-tris[(3-dimethylamino)propyl]hexahydrotriazine, potassium 2-ethylhexanoate and aliphatic quaternary ammonium salts, e.g. tetramethylammonium pivalate, and also mixtures of these.

Quantities preferably used of the catalysts (d) are from 0.05 to 3% by weight, preferably from 0.06 to 2% by weight, based on the total weight of all components (a) to (f).

The reaction of the abovementioned components optionally takes place in the presence of flame retardants and/or of other auxiliaries and additional substances (e).

Flame retardants that can be used are generally the flame retardants known from the prior art. Examples of suitable flame retardants are brominated ethers (e.g. Ixol® B251), brominated alcohols such as dibromoneopentyl alcohol, tribromoneopentyl alcohol and PHT-4-diol, and also chlorinated phosphates such as tris-(2-chloroethyl) phosphate, tris(2-chloroisopropyl) phosphate (TCPP), tris(1,3-dichloroisopropyl) phosphate, tris-(2,3-dibromopropyl) phosphate and tetrakis(2-chloroethyl) ethylenediphosphate. Materials that can also be used to provide flame retardancy to the rigid PUR/PIR foams produced in the invention, other than the halogen-substituted phosphates already mentioned, are inorganic flame retardants, for example red phosphorus, red-phosphorus-containing preparations, aluminum oxide hydrate, antimony trioxide, ammonium polyphosphate and calcium sulfate, or cyanuric acid derivatives, for example melamine, or mixtures of at least two flame retardants, for example of ammonium polyphosphates and melamine, and also optionally starch. Other liquid halogen-free flame retardants that can be used are diethyl ethanephosphonate (DEEP), triethyl phosphate (TEP), dimethyl propylphosphonate (DMPP), diphenyl cresyl phosphate (DPC), etc.

The quantity used of the flame retardants for the purposes of the present invention is preferably from 0 to 30% by weight, particularly preferably from 0.3 to 20% by weight, in particular from 0.5 to 15% by weight, based on the total weight of components (a) to (f).

Other auxiliaries and additional substances are preferably fillers, cell regulators, foam stabilizers, surface-active compounds and/or stabilizers in respect of oxidative, thermal or microbial degradation or ageing. Foam stabilizers is the term used for substances which promote development of a regular cell structure during formation of a foam. The following stabilizers may be listed by way of example: silicone-containing foam stabilizers, for example siloxane-oxyalkylene copolymers and other organopolysiloxanes, and moreover alkoxylation products of fatty alcohols, of oxo alcohols, of fatty amines, of alkyphenols, of dialkylphenols, of alkylcresols, of alkylresorcinol, of naphthol, of alkylnaphthol, of naphthylamine, of aniline, of alkylaniline, of toluidine, of bisphenol A, of alkylated bisphenol A or polyvinyl alcohol, and also moreover alkoxylation products of condensates of formaldehyde and alkylphenols, of formaldehyde and dialkylphenols, of formaldehyde and alkylcresols, of formaldehyde and alkylresorcinol, of formaldehyde and aniline, of formaldehyde and toluidine, of formaldehyde and naphthol, of formaldehyde and alkylnaphthol, and also of formaldehyde and bisphenol A. Further details concerning the abovementioned starting materials, and also concerning other starting materials, can be found in the technical literature, for example Kunststoffhandbuch [Plastics handbook] vol. VII, Polyurethane [Polyurethanes], Carl Hanser Verlag Munich, Vienna, 1st, 2nd and 3rd edn., 1966, 1983 and 1993.

Other compounds that can optionally be used are compounds (f) having at least two groups reactive toward isocyanates, i.e. compounds can be used which have at least two hydrogen atoms reactive toward isocyanate groups and which are described in general terms below and differ from the compounds (a).

Compounds that can be used having at least two groups reactive toward isocyanate are in particular those bearing two or more reactive groups in the molecule, selected from OH groups, SH groups, NH groups, $NH_2$ groups and CH-acidic groups, for example β-diketo groups. In particular, compounds having from 2 to 8 OH groups are used for the production of the rigid PUR/PIR foams preferably obtainable by the process of the invention. Preference is given to use of poly ether polyols and/or polyester polyols, where these differ from the compounds (a). The hydroxy number of the poly ether polyols and/or polyester polyols used in the production of rigid PUR/PIR foams is preferably from 25 to 850 mg KOH/g, particularly preferably from 25 to 480 mg KOH/g, and the molar masses are preferably above 230 g/mol. It is preferable that component (f) comprises polyether polyols obtained by known processes, for example by anionic polymerization of epoxides, catalyzed by alkali metal hydroxides such as sodium or potassium hydroxide, or alkali metal alcoholates such as sodium methanolate, sodium ethanolate or potassium ethanolate or potassium isopropanolate or aromatic amines such as N-methylimidazole, with addition of at least one starter molecule comprising from 2 to 8 reactive hydrogen atoms, or by cationic polymerization of epoxides, catalyzed by Lewis acids such as antimony pentachloride, boron fluoride etherate, etc., or bleaching earth, with addition of at least one starter molecule comprising from 2 to 8. The polyether polyols can moreover be produced by means of double-metal cyanide catalysis, and here again it is possible to use a fully continuous procedure.

Examples of alkylene oxides suitable for this purpose are butylene 1,2- and 2,3-oxide, ethylene oxide, propylene 1,2-oxide and styrene oxide. Particularly suitable alkylene oxides are those having from 2 to 4 carbon atoms in the alkylene moiety, in particular ethylene oxide, and propylene 1,2-oxide or butylene 1,2-oxide. The alkylene oxides can be added individually, blockwise in succession, blockwise in alternation, or as mixtures. Examples of starter molecules that can be used are aliphatic polyols, and also aliphatic and/or aromatic amines and polyamines, e.g. propylene 1,3-glycol, propylene 1,2-glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, water, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, methylol-group-containing condensates of formaldehyde and phenol or melamine or urea, and also Mannich bases. It is also possible to use high-functionality starter compounds based on hydrogenated starch hydrolysis products. These are described by way of example in EP-A 1 525 244. Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane. It is of course also possible to use mixtures of various starter compounds.

Component (f) can moreover optionally comprise polyester polyols, chain extenders and/or crosslinking agents. Chain extenders and/or crosslinking agents used are in particular di- or trifunctional amines and alcohols, in particular diols and/or triols with molar masses below 400 g/mol, preferably from 60 to 300 g/mol.

The rigid PUR/PIR foams are produced by reacting quantities of the polyisocyanates (b) and of components (a) and optionally (f) such that the isocyanate index of the formulation is >100, generally from 110 to 600, preferably from 150 to 500, particularly preferably from 180 to 450.

The isocyanate index here is the quotient calculated from the molar quantity [mol] of isocyanate groups actually used and the molar quantity [mol] of isocyanate groups stoichiometrically required for full conversion of all of the isocyanate-reactive groups, multiplied by 100. Since one mole of an isocyanate group is required for the conversion of one mole of an isocyanate-reactive group, the following equation applies:

$$\text{Index} = (\text{mols of isocyanate groups/mols of isocyanate-reactive groups}) \times 100.$$

The rigid PUR/PIR foams can be produced batchwise or continuously with the aid of known processes. The person skilled in the art is aware inter alia of block foam production (continuous and batchwise) and use in single-component systems (batchwise) and in molded insulation foam (batchwise). The invention described here relates to all of the processes. A preferred process is the continuous twin-belt process for the production of composite elements comprising rigid PUR/PIR foam cores and one or more outer layers, where flexible and/or rigid materials can be used as outer layers. Examples of outer layer materials are concrete, wood, pressboard, aluminum, copper, stainless steel, other types of steel, paper, nonwoven fabrics, in particular nonwoven mineral fabrics, and plastic, and also multilayer composites. Preferred plastics are acrylonitrile-butadiene-styrene copolymers, polyethylene, polystyrene, polyvinyl chloride and polypropylene. The nature of the outer layer here is in principle not subject to any restriction; relevant elements can be moldings, structural elements from the construction industry, pipes, housing parts, etc.

The present invention in particular provides the production of metal-composite elements. Metal-composite elements are sandwich-composite elements consisting of at least two outer layers and of a core layer situated therebetween. In particular, metal-foam composite elements consist at least of two outer layers made of metal and of a core layer made of a rigid polyurethane/polyisocyanurate (PUR/PIR) foam. These metal-foam composite elements are well known from the prior art and are also termed metal-composite elements. Between the core layer and the outer layers there can be other layers provided. By way of example, the outer layers can be coated, for example with a lacquer.

Examples of the use of these metal-composite elements are flat wall elements or wall elements having linear features, and also profiled roof elements for construction of industrial buildings and of cold stores, and also for truck bodies, industrial doors or transport containers.

These metal-composite elements can be produced continuously or batchwise. Equipment for continuous production is known by way of example from DE 1 609 668 A or DE 1 247 612 A. The closed-cell factor of the rigid PUR/PIR foams of the invention comprising rigid PUR foam materials and preferably rigid PUR/PIR foam materials is preferably greater than 90%, particularly preferably greater than 95%, determined in accordance with DIN EN ISO 4590:2003 by pressure change (pycnometer).

The envelope density of the rigid PUR/PIR foams of the invention is preferably from 25 g/m$^3$ to 300 g/m$^3$, particularly preferably from 28 g/m$^3$ to 50 g/m$^3$.

The rigid PUR/PIR foams of the invention are in particular used for thermal insulation, for example of refrigeration equipment, containers or buildings, e.g. in the form of insulated pipes, sandwich elements, or insulation sheets, or as insulation layer in refrigeration equipment.

The invention is illustrated hereinafter with reference to examples.

EXAMPLES

The invention will be explained in more detail with reference to the examples below. The following analysis methods were used:

Hydroxy number: OH number was determined in accordance with the requirements of DIN 53240 (December 1971).

Acid number: in accordance with DIN EN ISO 2114 (June 2002)

Coefficient of thermal conductivity: in accordance with DIN 52616:1977-11; with temperature difference 20 K and foam midpoint temperature 10° C.

Fiber time: The fiber time ("gel point $t_G$") is determined by inserting a wooden stick into, and then extracting it from, the reacting mixture. It characterizes the time at which the mixture begins to harden. The time stated as to is that at which it first becomes possible to draw fibers between wooden stick and reacting mixture. The time measurement starts with the mixing of the foam components.

Tack-free time: Shortly after the fiber time has been reached, a wooden stick is used at short time intervals to test the foam surface. The tack-free time, measured from the start of the mixing procedure, is reached when the wooden stick is released from the foam surface without difficulty and without any adhering product.

Envelope density: Envelope densities were determined in accordance with DIN EN ISO 845:2009-10.

Dimensional stability: Dimensional stability is determined by sawing a sample block of volume at least 100 cm$^3$ and comprising no compacted peripheral-zone regions, from a foam block produced at least 12 hours previously, and determining the precise dimensions of the sample block at room temperature. The sample is stored for the stated time (e.g. 24 hours) at elevated temperature (e.g. 100° C.), and its dimensions are again determined after 30 minutes of cooling to room temperature. The relative changes of the dimensions are stated in percent of the respective original dimensions.

Adhesion: Foam adhesion is determined qualitatively in the laboratory by producing the foam in a paper-lined open-top wooden mold with edge lengths 20 cm×20 cm and after 5 minutes and respectively 24 hours manually peeling said paper from the foam. Adhesion behavior is evaluated qualitatively on the following scale: very good=1, good=2, moderate=3, poor=4 and no adhesion=5.

The procedure for adhesion tests on foam samples produced on the twin conveyor belt is similar, but in this case a metal sheet measuring 50 cm*90 cm is inserted and overfoamed.

Viscosity: The dynamic viscosity values were determined by using the MCR 51 rheometer from Anton Paar in accordance with DIN 53019:2008-09 with a CP 50-1 measuring cone, diameter 50 mm, with 1° angle at shear rates of 25, 100, 200 and 500 s$^{-1}$. The inventive and non-inventive polyols exhibit viscosity values independent of the shear rate.

Fire properties: BVD test corresponding to basic Swiss test issued by the Vereinigung kantonaler Feuerversicherungen [Association of Cantonal Fire Insurers] for determining the combustibility level of construction materials, 1988 issue, with the supplements of 1990, 1994, 1995 and 2005 (which can be purchased from Vereinigung kantonaler Feuerversicherungen, Bundesstr. 20, 3011 Bern, Switzerland).

Compressive strength/Compressive modulus of elasticity: Determined in the compression test in accordance with DIN EN 826:2013.

Impression depth: This was determined on the foam produced in an open-top wooden mold with edge lengths 20 cm×20 cm (see Adhesion) after 1.5 minutes, measured from mixing of the foam components, i.e. before the foam had completed its reaction, by superposing a 6 kg weight with a circular contact surface of diameter 2 cm and then determining the impression depth in mm after a time of 2.5 and 5 minutes, likewise measured from mixing of the foam components. The thickness of the foam layer is about 15 cm.

Transverse tensile strength: This was determined in the tensile test perpendicularly to the outer layer in accordance with EN 1607.

Raw Materials Used

Polyester S240P: A polyester polyol from Covestro Deutschland AG, produced by condensation, based on phthalic anhydride and diethylene glycol with hydroxy number 240±15 mg KOH/g, acid number max. 1.80 mg KOH/g and viscosity, measured at 25° C., 12000±2500 mPas.

Desmophen 2382: Polyester polyol from Covestro Deutschland AG with OHN about 240 mg KOH/g, produced by polycondensation.

Desmophen® V657: Reactive trifunctional polyether polyol for the production of polyurethane products from Covestro Deutschland AG with hydroxy number 255±15 mg KOH/g, acid number max. 0.350 mg KOH/g and viscosity, measured at 25° C., 265±20 mPas.

Desmophen® T460: Amine-based polyfunctional polyether polyol for the production of polyurethane products from Covestro Deutschland AG with hydroxy number 415±20 mg KOH/g and viscosity, measured at 25° C., 8000±1500 mPas.

Desmophen® L2830: Bifunctional polyether polyol with predominantly primary hydroxy groups from Covestro Deutschland AG with hydroxy number 26-30 mg KOH/g and viscosity, at 25° C., 790-930 mPa·s Levagard PP: Trischloroisopropyl phosphate; flame retardant from Lanxess TEP: Triethyl phosphate, flame retardant from Lanxess Additive 1132: From Covestro Deutschland AG, comprising the reaction product of phthalic anhydride and diethylene glycol with acid number about 97 mg KOH/g.

B8443: Tegostab B8443, stabilizer from Evonik

Additive 19IF00 A: Component acting as co-blowing agent for the production of rigid PUR/PIR foams from Covestro Deutschland AG with hydroxy number 1440±50 mg KOH/g, amine number 290±15 mg KOH/g, acid number 142±9 mg KOH/g and viscosity, at 25° C., 390±70 mPa·s.

Desmorapid 1792: Blowing agent from Covestro Deutschland AG; used for the production of rigid polyurethane foam products. Desmorapid® 1792 catalyzes the polyisocyanurate reaction.

Activator 726-B: N,N-Dimethylcyclohexylamine. Catalyst for the production of polyurethanes from Covestro Deutschland AG.

n-Pentane: n-pentane from Julius Hoesch.

Desmodur® 44V70L: Liquid mixture of diphenylmethane 4,4'-diisocyanate (MDI) with isomers and higher-functionality homologs with NCO content in the range from 30.5 to 32.0% by weight of NCO and viscosity, at 25° C., in the range from 610 to 750 mPas from Covestro Deutschland AG.

NMI: N-methylimidazole from BASF

N-methyldiethanolamine: from Aldrich

Desmorapid DB: N,N-dimethylbenzylamine, catalyst (Lanxess AG).

Desmophen® 4051 B: Amine-based tetrafunctional polyether polyol for the production of polyurethane products with hydroxy number from 450 to 490 mg KOH/g and viscosity, measured at 25° C., from 4950 to 5850 mPas (Covestro Deutschland AG).

EO: Ethylene oxide from Ineos

PO: Propylene oxide from Lyondell

Irganox 1076: Octadecyl 3-(3,5-di-tert-butyl-4-hydroxyphenyl)propionate (Ciba Specialty Chemicals (now BASF)), antioxidant.

A.) Production of Polyester Polyols by Polyaddition Reactions

Production Specification Example A-1

273.6 g of diethylene glycol (DEG) and 1.8 g of N-methylimidazole (NMI) were charged to a 2 l laboratory autoclave. After heating to 50° C., 580.3 g of phthalic anhydride were added. After the inlet neck had been sealed, oxygen was removed by filling the apparatus with nitrogen at an absolute pressure of 3.0 bar and then releasing the elevated pressure to atmospheric pressure, and repeating this procedure a further four times. The stirrer rotation rate (crossblade stirrer) was 200 rpm, while the contents of the autoclave were heated to 120° C. The resultant pressure (absolute pressure) toward the end of the heating phase was 2.8 bar. The stirrer rotation rate was increased to 800 rpm, and then 346.1 g of ethylene oxide were added over a period of 5.95 h at constant addition rate into the overhead space in the autoclave. The maximal value reached by the reactor pressure (absolute pressure) toward the end of the addition phase was 5.0 bar. The final pressure (absolute pressure) reached after a continued reaction time of 4.1 h was 3.9 bar. The product was then heated at 120° C. in vacuo for 1.0 h. After cooling to 80° C., 0.630 g of Irganox® 1076 were added. The OH number of the product was 250 mg KOH/g and viscosity, at 25° C., was 9805 mPas.

TABLE 1

Production and properties of the polyols: The suffix "V" indicates comparative experiments, while the remaining experiments use polyols of the invention

| Polyol | | A-1 | A-2 | A-3V | A-4V | A-5V | A-6V | A-7V | A-8V | A-9V | A-10V | A-11 | A-12V | A-13 | A-14 |
|---|---|---|---|---|---|---|---|---|---|---|---|---|---|---|---|
| Phthalic anhydride (PA) | [g] [mol] | 580.3 3.92 | 580.6 3.92 | 580.5 3.92 | 581.2 3.92 | 581.6 3.93 | 581.2 3.92 | 582.3 3.93 | 810.0 5.47 | 319.2 2.16 421.5 4.30 | 744.4 5.02 | 581.0 3.92 | 580.6 3.92 | 580.7 3.92 | 580.6 3.92 |
| Maleic anhydride (MA) | [g] [mol] | | | | | | | | | | | | | | |
| Diethylene glycol (DEG) | [g] [mol] | 273.6 2.58 | 273.3 2.58 | 273.5 2.58 | 273.4 2.58 | 273.4 2.58 | 273.6 2.58 | 273.6 2.58 | | | | 273.3 2.58 | 273.5 2.58 | 251.2 2.37 | 251.4 2.37 |
| Ethylene glycol (EG) | [g] [mol] | | | | | | | | 132.6 2.14 | 132.6 2.14 | 133.3 1.25 | | | | |
| 2-Ethyl-1-hexanol | [g] [mol] | | | | | | | | | | | | | | |
| Diethylene glycol monobutyl ether | [g] [mol] | | | | | | | | | | | | | 54.7 0.42 | 67.8 0.42 |
| Ethylene oxide (EO) | [g] [mol] | 346.1 7.86 | 346.1 7.86 | 346.1 7.86 | 346.1 7.86 | 346.1 7.86 | 346.1 7.86 | 346.1 7.86 | 257.4 5.84 | 327.0 7.42 | | 454.5 10.32 | 346.1 7.86 | 346.1 7.86 | 346.1 7.86 |
| Propylene oxide (PO) | [g] [mol] | | | | | | | | | | 327.9 5.64 | | | | |
| N-Methylimidazole | [g] [mol] [ppm]* | 1.8 0.02 1500 | 1.817 0.022 1500 | | | | | | 1.813 0.022 1500 | 1.806 0.022 1500 | 1.827 0.022 1500 | 1.977 0.024 1500 | | 1.849 0.023 1500 | 1.873 0.023 1500 |
| N-Methyldiethanolamine | [g] [mol] [ppm]* | | | 2.413 0.02 2000 | 2.400 0.02 2000 | 4.806 0.04 4000 | | | | | | | | | |
| N,N-Dimethylbenzylamine | [g] [mol] [ppm]* | | | | | | 2.417 0.018 2000 | 2.417 0.018 2000 | | | | | | | |
| Desmophen 4051 B | [g] [mol] [ppm]* | | | | | | | | | | | | 18.035 0.038 15 000 | | |
| Anhydride/glycol molar ratio | | 1/0.66 | 1/0.66 | 1/0.66 | 1/0.66 | 1/0.66 | 1/0.66 | 1/0.66 | 1/0.39 | 1/0.33 | 1/0.25 | 1/0.66 | 1/0.66 | 1/0.60 | 1/0.60 |
| Molar ratio of epoxy to acid groups*** | | 2/1 | 2/1 | 2/1 | 2/1 | 2/1 | 2/1 | 2/1 | 1.07/1 | 1.15/1 | 1.12/1 | 2.63/1 | 2.00/1 | 2/1 | 2/1 |
| Reaction temperature | [° C.] | 120 | 110 | 120 | 110 | 120 | 110 | 120 | 110 | 100 | 130 | 120 | 120 | 120 | 120 |
| Reaction time** | [h] | Nd | 10 | 29 | 32 | 32 | 24 | 16 | 24 | 15 | 23 | 14 | 32 | 16 | 15 |
| Hydroxy number | [mg KOH/g] | 250 | 246 | 267 | 263 | 278 | 256 | 256 | 182.5 | 197.5 | 116 | 238 | 269 | 246 | 245 |
| Acid number | [ppm KOH] | 12 | 6 | 40 | 8 | 43 | 30 | 150 not det. | 22.3 | 255 | 20 | 20 | 135 | 79 | 115 |
| Viscosity at 25° C. | [MPas] | 9800 | 9930 | 9000 | 8470 | 8470 | 10180 | | glassy solid | 4415 @ 50° C. | glassy solid | 6700 | 9260 | 5310 | 5080 |
| Starting material for Example | | B-2, B-3, B-5, B-6, B-7. | | | | | | | | | | | | | |

[ppm]*: based on all of the starting materials
Reaction time**: Sum of epoxide addition time and continued reaction time required to achieve constant pressure in hours
acid groups***): It is assumed that each mole of anhydride used produces an acid group by ring-opening Table 1 shows the formulations of the inventive polyols A1, A2, A11, A13 and A14.

A3V, A4V, A5V, A6V, A7V and A12V are not inventive because the catalysts used for the production process do not comprise any nitrogen atoms that are part of an aromatic ring system. A8V, A9V and A10V are not inventive because the equivalents ratios of acid groups to alkylene oxides used for the production process are not in the range from 1:1.6 to 1:3.0.

B.) Production of the Rigid PUR/PIR Foams

Rigid PUR/PIR foams were on a laboratory scale by adding, to the respective polyol, flame retardant, foam stabilizer, catalyst, water and blowing agent.

The resultant isocyanate-reactive composition was mixed with the isocyanate and cast into a mold. The mixture itself was produced by using a stirrer at 4200 rpm and a raw materials temperature of 23° C. Table 2 collates the precise formulations inclusive of the results of appropriate physical tests.

TABLE 2

Production of PUR/PIR foams on a laboratory scale and properties thereof.

| | | Example: | | |
|---|---|---|---|---|
| | | B-1V Standard | B-2 | B-3 |
| Polyol component: | | | | |
| Polyester S240P | [parts by wt] | 63.8 | | |
| Polyol A-1 | [parts by wt] | | 53.8 | 53.8 |
| Desmophen V657 | [parts by wt] | 5.0 | | |
| Desmophen T460 | [parts by wt] | | 5.0 | 5.0 |
| Desmophen L2830 | [parts by wt] | | 10.0 | 10.0 |
| Levagard PP | [parts by wt] | 20.0 | 25.0 | 25.0 |
| TEP | [parts by wt] | 5.0 | | |
| Additive 1132 | [parts by wt] | 2.2 | 2.2 | 2.2 |
| B8443 | [parts by wt] | 4.0 | 4.0 | 4.0 |
| Viscosity before addition of water | [mPas] at 25° C. | 1400 | 1650 | 1650 |
| Water | [parts by wt] | | 1 | 1 |
| Additive 19IF00A | [parts by wt] | 1.5 | 1.5 | |
| Desmorapid 1792 | [parts by wt] | 4.0 | 3.8 | 2.7 |
| Activator 726-B | [parts by wt] | | | 0.5 |
| Pentane | [parts by wt] | 15.1 | 12.9 | 11.8 |
| Isocyanate component: | | | | |
| Desmodur 44V70L | [parts by wt] | 203 | 241 | 216 |
| Production and properties: | | | | |
| Index | | 350 | 331 | 331 |
| Fiber time | [s] | 46 | 48 | 47 |
| Tack-free time | [s] | 59 | 62 | 82 |
| Envelope density | [kg/m³] | 38.9 | 38.2 | 40.2 |
| Adhesion after 5 min/24 h | | 2/2 | 2/2 | 1-2/2 |
| Impression depth, 2.5/5 min | [mm] | 7.0/8.0 | 4.0/4.5 | 10.0/11.0 |
| Dimensional stability after 24 h at 100° C.: length, width and thickness | (%, max) | −0.1/0/−0.2 | −0.6/−0.3/−0.1 | 0.2/0.4/−0.2 |
| BVD (class) | | 5 | 5 | 5 |
| BVD (average value of flame height) | [mm] | 133 | 130 | 120 |

Table 2 therefore shows that the objects were achieved.

The inventive examples B-2 and B-3 achieve the BVD fire class of the industry standard B-1V, while other important properties such as envelope density, dimensional stability and adhesion behavior at least remain unchanged or indeed are slightly improved.

TABLE 3

Production of PUR/PIR foams in a twin-conveyor-belt system and properties thereof. Foam thickness was set to 105 mm, and aluminum foil of thickness 50 μm was used as outer layer.

| | | Example | | | |
|---|---|---|---|---|---|
| | | B-4V Reference | B-5 | B-6 | B-7 |
| Polyol component: | | | | | |
| Desmophen 2382 | [parts by wt] | 63.8 | | | |
| Polyol A-1 | [parts by wt] | | 53.8 | 53.8 | 53.8 |
| Desmophen V657 | [parts by wt] | 5.0 | | | |
| Desmophen T460 | [parts by wt] | | 5.0 | 5.0 | 5.0 |
| Desmophen L2830 | [parts by wt] | | 10.0 | 10.0 | 10.0 |
| Levagard PP | [parts by wt] | 20.0 | 25.0 | 25.0 | 25.0 |
| TEP | [parts by wt] | 5.0 | | | |
| Additive 1132 | [parts by wt] | 2.2 | 2.2 | 2.2 | 2.2 |
| B8443 | [parts by wt] | 4.0 | 4.0 | 4.0 | 4.0 |
| Water | [parts by wt] | | 1.0 | 1.0 | 1.0 |
| Additive 19IF00A | [parts by wt] | 1.5 | 1.5 | | |
| Desmorapid 1792 | [parts by wt] | 5.0 | 5.2 | | |
| Activator 726-B | [parts by wt] | | | 0.5 | 0.5 |
| Pentane | [parts by wt] | 16.6 | 14.7 | 13.9 | 14.8 |
| Isocyanate component: | | | | | |
| Desmodur 44V70L | [parts by wt] | 210 | 250 | 221 | 240 |
| Production and properties: | | | | | |
| Index | [ ] | 354 | 334 | 335 | 361 |
| Fiber time | [s] | 31 | 30 | 32 | 31 |
| Envelope density | [kg/m³] | 39 | 38.9 | 39.4 | 39.5 |
| BVD (class) | | 5 | 5 | 5 | 5 |
| BVD (average value of flame height) | [mm] | 146 | 123 | 120 | 130 |
| Coefficient of thermal conductivity, 10° C., zero value | [mW/(m * K)] | 21.86 | 20.57 | 21.36 | 22.0 |
| Compressive strength/ | [MPa] | 0.126 | 0.145 | 0.207 | 0.249 |
| Compressive modulus of elasticity | [MPa] | 3.48 | 3.98 | 6.24 | 8.51 |
| Transverse tensile strength | [MPa] | 0.109 | 0.122 | 0.120 | 0.143 |
| Dimensional stability at 100° C., length, width and thickness | [%] | 1.8 | −0.5/−0.3/ 0.8 | −0.1/−0.6/ 1.3 | −0.6/ 0.2/0.9 |
| Adhesion, metal sheet, fresh/24 h | | 2/3 | 2/4 | 2/3+ | 2/4 |
| Belt temperature | [° C.] | 60 | 60 | 60 | 60 |

Again, therefore, table 3 shows that the objects were achieved.

In particular, the inventive examples B-5, B-6 and B-7 achieve the BVD fire class of the industry standard B-4V, with significantly reduced flame height. Other important properties such as coefficient of thermal conductivity, compressive strength, dimensional stability and adhesion behavior at least remain unchanged or indeed are slightly improved.

What is claimed is:

1. A process for the production of rigid PUR/PIR foams, comprising reacting
   (a) at least one polyester polyol obtainable via reaction of
      a.1.) at least one cyclic carboxylic anhydride;
      a.2.) at least one low-molecular weight diol with molecular weight from 62 to 450 daltons; and
      a.3.) at least one alkylene oxide;
      by esterifying components a.1.) and a.2.), followed by alkoxylating the resultant carboxylic hemiester by means of component a.3.); wherein the alkoxylation reaction occurs in the presence of
      a.4.) at least one aminic catalyst in which the nitrogen atom(s) is (are) part of an aromatic ring system, with
   (b) at least one polyisocyanate-containing component,
   (c) at least one blowing agent,
   (d) at least one catalyst,
   (e) optionally, at least one flame retardant and/or other auxiliaries and/or additional substances,
   (f) optionally at least one compound having at least two groups which are reactive toward isocyanates and differ from the polyester polyol (a);
   wherein a.3.) is selected from ethylene oxide or from a mixture of ethylene oxide and propylene oxide;
   wherein ethylene oxide is added in an amount of from 90 to 100% by weight, based on the total weight of the alkylene oxide a.3.);
   and
   wherein the equivalents ratio of a.3.) to a.1.) is from 1.7:1 to 3:1.

2. The process as claimed in claim 1, wherein the OH number of (a) said polyester polyol is from 100 to 280 mg KOH/g.

3. The process as claimed in claim 1, wherein a.4.) is selected from the group of imidazole and imidazole derivatives.

4. The process as claimed in claim 1, wherein a.1.) comprises maleic anhydride, itaconic anhydride, citraconic anhydride, succinic anhydride, glutaric anhydride, phthalic anhydride and tetrahydrophthalic anhydride, or mixtures thereof.

5. The process as claimed in claim 1, wherein a.2.) comprises ethylene glycol, diethylene glycol, triethylene glycol, tetraethylene glycol, or mixtures thereof.

6. The process as claimed in claim 1, wherein (b) comprises tolylene 2,4-diisocyanate, tolylene-2,6-diisocyanate, diphenylmethane 4,4'-diisocyanate, diphenylmethane-2,4'-diisocyanate, derivatives thereof, or mixtures thereof.

7. The process as claimed in claim 1, wherein (c) comprises n-pentane, cyclopentane, isopentane, water, carboxylic acids, or mixtures thereof.

8. The process as claimed in claim 1, wherein (e) comprises a flame retardant, filler, cell regulator, foam stabilizer, surface-active compound, oxidative stabilizer, thermal stabilizer, microbial degradation stabilizer, ageing stabilizer, or a mixture thereof.

9. The process as claimed in claim 1, wherein (f) comprises at least one polyether polyol, a polyester polyol which is different than said polyester polyol (a), or a mixture thereof.

10. The process as claimed in claim 1, wherein
(a) is present in an amount of from 10 to 24% by weight;
(b) is present in an amount of from 43 to 89% by weight;
(c) is present in an amount of from 0.1 to 30% by weight;
(d) is present in an amount of from 0.05 to 3% by weight;
(e) is present in an amount of from 0.5 to 12% by weight;
(f) is present in an amount of from 0.1 to 9% by weight;
wherein the sum of components (a) to (f) totals 100% by weight.

11. A rigid PUR/PIR foam obtainable by a process as claimed in claim 1.

12. A composite element comprising (i) a foam core comprising a rigid PUR/PIR foam as claimed in claim 11 and (ii) at least one outer layer comprising concrete, wood, pressboard, aluminum, copper, stainless steel, other types of steel, paper, nonwoven fabric, or plastic, wherein the surface of said foam core is attached to the surface of said outer layer.

13. A thermal insulation composite element comprising (i) a foam core comprising the rigid PUR/PIR foam as claimed in claim 11 and (ii) at least one outer layer comprising concrete, wood, pressboard, aluminum, copper, stainless steel, other types of steel, paper, nonwoven fabric, or plastic, wherein the surface of said foam core is attached to the surface of said outer layer.

14. The process as claimed in claim 1, wherein
(a) is present in an amount of from 12 to 22% by weight;
(b) is present in an amount of from 48 to 83% by weight;
(c) is present in an amount of from 0.5 to 20% by weight;
(d) is present in an amount of from 0.06 to 2% by weight;
(e) is present in an amount of from 3 to 9% by weight;
(f) is present in an amount of from 1.4 to 7.5% by weight;
wherein the sum of components (a) to (f) totals 100% by weight.

15. The process of claim 3, wherein a.4.) comprises N-methylimidazole.

16. The process as claimed in claim 1, wherein the molar ratio of said cyclic carboxylic anhydride a.1) to said low molecular weight diol a.2) ranges from 1:0.3 to 1:1.5.

* * * * *